H. S. SHEPARDSON.
FRICTION CLUTCH OR PULLEY.

No. 43,138.  Patented June 14, 1864.

Witnesses
A. Moore
Jn. S. Patton

Inventor:
H. S. Shepardson
By atty N. W. Stoughton

UNITED STATES PATENT OFFICE

H. S. SHEPARDSON, OF SHELBURNE FALLS, MASSACHUSETTS.

IMPROVEMENT IN FRICTION CLUTCHES OR PULLEYS.

Specification forming parts of Letters Patent No. 43,138, dated June 14, 1864.

*To all whom it may concern:*

Be it known that I, H. S. SHEPARDSON, of Shelburne Falls, in the county of Franklin and State of Massachusetts, have invented certain new and useful Improvements in Friction Clutches or Pulleys; and I do hereby declare that the following is a full, clear, and exact description of the same, reference being had to the accompanying drawings, making a part of this specification, in which—

Figure 1:
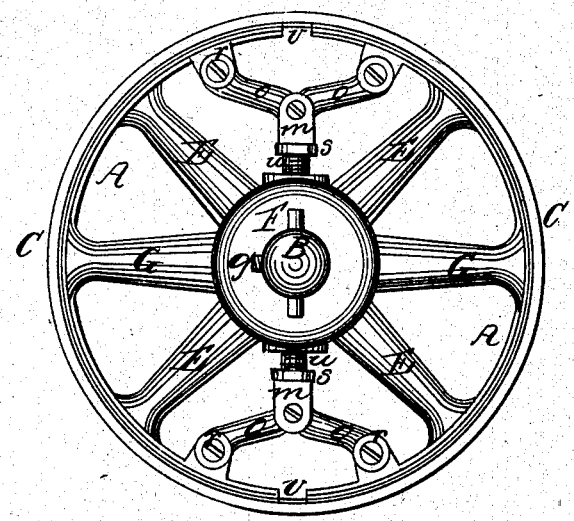
Figure 2:
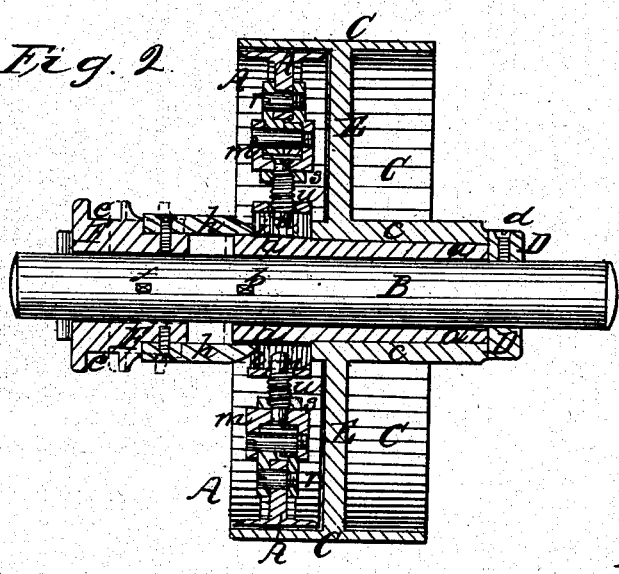

Figure 1 represents a side view of the pulley or clutch, and Fig. 2 represents a section through the same in the direction of the line of the shaft on which it is to be placed.

Similar letters, where they occur, denote like parts in both of the figures.

My invention consists, first, in the combination of the wedges on the sliding collar with the radial arms on the hub of the clutch-ring for forcing out said clutch or friction ring against the inner perimeter of the pulley; and, secondly, it consists in the manner of connecting the radial arms to the segmental friction-ring, so as to more directly apply the force of said arms to the expanding of said segments.

To enable others skilled in the art to make and use my invention, I will proceed to describe the same with reference to the drawings.

The hub $a$ of the expansive or friction ring A is fitted to the shaft B by a feather, $b$, and suitable slot, so that both shall turn together. The hub $c$ of the pulley C is fitted upon and over the hub $a$, so as to turn independent of said hub $a$ when unclutched from its ring A. A collar, D, with a set-screw, $d$, or otherwise, holds the pulley and its hub $c$ in position at one end and the hub $a$ of the friction-ring at the other end. The arms E of the pulley are at or near the center of the face or perimeter of said pulley, so that the rim of the pulley overhangs said arms.

F is a collar that moves endwise on the shaft B, and is grooved at $e$ for the shipper to work in. This collar, by means of a feather, $f$, and slot $g$, can turn with the shaft and be slid along the shaft at the same time. Upon the collar F are two wedge-shaped pieces, $h$ $h$, which work in two mortises or openings, $i$ $i$, near the hub $a$ of the expansive ring A. When the wedges are forced into these openings, they pass under pins or arms $n$ $n$, which have cross-heads $m$ upon them, to which one end of of the pair of toggle-arms $o$ $o$ is hinged, the other ends of said levers being hinged or pivoted at $r$ to lugs cast or wrought upon the segmental expansive ring A. The toggle-levers, it will be perceived, are hinged to the expansive or friction segments A so as to straddle the cut $v$ in said ring, each toggle of the pair working upon different segments, and thus the slightest motion of the levers $o$ clamps or releases the segments from the drum of the pulley, as the case may be. When the wedges $h$ $h$ are forced into the position shown in red lines in Fig. 2, the segments are tightly clamped against the pulley, so that all shall run with the shaft, and when in the position shown in black lines in Fig. 2, then the pulley is unclutched and can run independent of the shaft and friction clutch, or stop, while they continue to run.

The segmental friction-ring A is entirely under the rim of the pulley, and only moves radially and not along the shaft, and thus is out of the way and makes a neat piece of mechanism. Each segment has one arm, G, cast or wrought on it to hold it in place and prevent the segments from moving toward the center, and thus the minutest expansion of the ends or split portions of the segments immediately clamps itself to the pulley, or unclamps it, as the case may be; and to make this clamping and unclamping at all times perfect a nut, $s$, on the screw $u$ may be adjusted so as to make it very sensitive and reliable, and instantaneous in its action, said screw $u$ being made on a portion of the arm $n$, against which the wedges $h$ work. To cause the wedges $h$ $h$ to more freely move the arms $n$ $n$, I propose to place small friction-rolls upon the ends of said arms, to reduce the friction between the two parts, without impairing the radial force upon the arms by the wedges.

Having thus fully described my invention, what I claim therein as new, and desire to secure by Letters Patent, is—

1. The combination of the wedges $h$ on the sliding collar F with the radial arms $n$, connected with the expansive or friction ring A, substantially as and for the purpose described.

2. Connecting the radial arms $n$ to the friction-segments by toggle levers $o$ $o$, which straddle the cuts in said ring, as and for the purpose described.

H. S. SHEPARDSON.

Witnesses:
F. R. PRATT,
NELSON SPRAGUE.